3,595,880
PREPARATION OF (CIS-1,2-EPOXYPROPYL)
PHOSPHONIC ACIDS
Raymond A. Firestone, Fanwood, N.J., assignor to
Merck & Co., Inc., Rahway, N.J.
No Drawing. Filed May 15, 1968, Ser. No. 729,376
Int. Cl. C07d 1/20, 1/22
U.S. Cl. 260—348                                6 Claims

ABSTRACT OF THE DISCLOSURE

Process for the preparation of (cis-1,2-epoxypropyl) phosphonic acids, esters or salts thereof which comprises eliminating or extruding sulfur dioxide, sulfur trioxide, carbon monoxide or nitrogen from an appropriately substituted 1,3-oxathietane S,S-dioxide compound, 1,3,4-dioxathiol S,S-dioxide compound, 3-oxo oxetan compound and 1,3,4-oxadiazoline compound, respectively. The 1,2-epoxypropyl phosphonic acids or salts thereof are active antibacterial agents.

DESCRIPTION OF THE INVENTION

Preferred embodiments

This invention relates to a novel method for preparing salts or esters of (cis-1,2-epoxypropyl) phosphonic acid or the free acid itself. More particularly, the invention relates to a novel process for preparing salts or esters of (±) (cis-1,2-epoxypropyl) phosphonic acid or the free acid itself by extruding or eliminating sulfur dioxide, sulfur trioxide, carbon monoxide or nitrogen from (±) (cis-4-methyl-1,3-oxathietan-2-yl) phosphonic acid S,S-dioxide; (±) (cis-2-methyl-1,3,4-dioxathiol-5-yl) phosphonic acid S,S-dioxide; (±) (cis-4-methyl-3-oxo oxetan-2-yl) phosphonic acid or (±) (cis-5-methyl-1,3,4-oxadiazolin-2-yl) phosphonic acid or from the esters or salts of the above compounds. The invention may be schematically represented as follows:

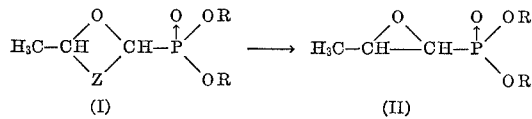

In the above Formulae I and II Z represents

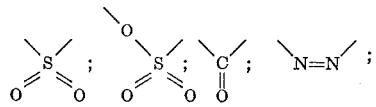

namely sulfur dioxide, sulfur trioxide, carbon monoxide or nitrogen radicals respectively; R represents hydrogen or a hydrocarbyl radical and can be the same or different in any particular compound. Compounds of Formulae I and II can also be mono- or di-organic or inorganic salts of the acids, and it is a preferred embodiment of this invention to prepare the inorganic or organic salts of the acids of Formula II.

When R in the above compounds is a hydrocarbyl radical, it may be an aliphatic, cycloaliphatic, araliphatic, aromatic or heterocyclic radical which may, if desired, be further substituted. Thus, for example, it may be aliphatic such as substituted or unsubstituted alkyl, alkenyl or alkynyl, representative examples of which are alkyl such as methyl, propyl, isopropyl, t-butyl, hexyl, octyl, decyl, dodecyl, haloethyl, acyloxyethyl, hydroxypropyl, aminoethyl or alkylaminomethyl; alkenyl such as allyl, methallyl, propenyl, hexenyl, octadienyl; alkynyl such as propargyl, ethinyl or chlorthinyl; cycloalkyl such as cyclohexyl, cyclohexenyl or cyclopropyl. When R is aliphatic, it preferably has from 1–6 carbon atoms.

Examples of R representing an araliphatic radical are those cases where it is aralkyl such as benzyl, phenethyl, phenylpropyl, p-halobenzyl and o-, m- or p-alkoxybenzyl.

R may also represent an aromatic radical and preferably a mononuclear aromatic residue such as phenyl or substituted phenyl, e.g. p-chlorophenyl, o-nitrophenyl, o,p-dihalophenyl, cyanophenyl, methoxyphenyl and tolyl. When R is heterocyclic, it may be heteroaromatic such as pyridyl, furyl, thiazolyl or pyrazinyl, or alternatively it may represent a hydrogenated hetero ring, examples of which are tetrahydrofuryl and piperazinyl.

Those compounds of Formulae I and II which are acidic, i.e., the free acids and the mono-esters, may be in the form of salts, and the preparation of such salts constitute an especially preferred aspect of the invention because they are highly useful when the (±) (cis-1,2-epoxypropyl) phosphonic acid compounds are employed as antibacterial agents since the free phosphonic acids are not as stable as could be desired, and the esters are not (except in particular instances) as active as the salts.

As stated previously, the invention can relate to processes for the preparation of organic or inorganic salts of the compounds of Formula II when at least one of R is hydrogen. Thus, examples of such salts are inorganic metallic salts such as the mono- and di-sodium salts, the mono- and di-potassium salts, calcium, magnesium, silver and iron salts. Organic salts that might be mentioned as representative include the amine salts such as α-phenethylamine, ammonium, quinine, brucine, lysine, protamine, arginine, procaine, ethanolamine, morphine, benzyl ammonium, ethylenediamine, piperazine and glycine. If desired, the basic moiety of the salt may be a biologically active amine such as erythromycin or novobiocin.

The (cis-1,2-epoxypropyl) phosphonic acid, particularly the (±) (cis-1,2-epoxypropyl) phosphonic acid described herein, and the salts thereof, have significant antibacterial activity against a large number of pathogens. They are useful anti-microbial agents, which are active in inhibiting the growth of both gram-positive and gram-negative pathogenic bacteria. They are active against species of Bacillus, Escherichia, Staphylococci, Salmonella and Proteus pathogens, and antibiotic-resistant strains thereof. Illustrative of such pathogens are *Bacillus subtilis, Escherichia coli, Salmonella schottmuelleri, Salmonella gallinarum, Salmonella pullorum, Proteus vulgaris, Proteus mirabilis, Proteus morganii, Staphylococcus aureus* and *Staphylococcus pyogenes.* Thus, (±) (cis-1,2-epoxypropyl) phosphonic acid and salts thereof can be used as antiseptic agents to remove susceptible organisms from pharmaceutical, dental and medical equipment and other areas subject to infection by such organisms, and to inhibit harmful bacterial growth in industrial paints. Similarly, they can be used to separate certain microorganisms from mixtures of microorganisms. They are useful in the treatment of diseases caused by bacterial infections in man and animals and are particularly valuable in this respect, since they are active against many strains of pathogens resistant to previously available antibiotics. The salts are especially valuable, since they are effective when given orally, although they can be administered parenterally if desired.

The salts of (±) (cis-1,2-epoxypropyl) phosphonic acid are useful as preservatives in industrial applications since they effectively inhibit undesirable bacterial growth in the white water used in paper mills and in paints, e.g. in polyvinyl acetate latex paint.

The designation cis used in describing the 1,2-epoxypropyl phosphonic acid compounds of Formula II means that each of the hydrogen atoms attached to carbon atoms 1 and 2 of the propyl phosphonic acid are on the same side of the oxide ring.

As can be seen, when the compound of Formula I is converted to the compound of Formula II, the Z radical is eliminated or extruded and a bond forms between the two carbon atoms. The epoxy oxygen is already in place and this bond is not effected by the present extrusion or elimination reaction.

According to the present invention, the elimination or extrusion of sulfur dioxide, sulfur trioxide, carbon monoxide or nitrogen for the appropriate starting material of Formula I is accomplished by pyrolyzing or heating the appropriate starting compound shown by Formula I or the elimination or extrusion of sulfur dioxide, sulfur trioxide, carbon monoxide or nitrogen can also be accomplished by subjecting the appropriate starting material of Formula I to ultra violet light.

According to one aspect of the present invention, the elimination or extrusion of sulfur dioxide, sulfur trioxide, carbon monoxide or nitrogen from the appropriate starting material of Formula I is accomplished by pyrolyzing or heating the appropriate starting material at temperatures above 80° C. Preferable temperatures at which the pyrolysis is carried out will vary according to which starting material is used. Thus, when the starting material of Formula I is the (4-methyl-1,3-oxathietan-2-yl) phosphonic acid S,S-dioxide or preferably a salt or ester thereof, the pyrolysis is usually accomplished by heating at temperatures above 100° C., preferably at temperatures between 100° C. and 200° C. When the starting material of Formula I is (2-methyl-1,3,4-dioxathiol-5-yl) phosphonic acid S,S-dioxide or preferably a salt or ester thereof, the pyrolysis is generally carried out above 100° C. with the preferred temperature range being about 150° C. to 250° C.

Similarly, when the starting material of Formula I is the (4-methyl-3-oxo oxetan-2-yl) phosphonic acid, ester or salt thereof or the (5-methyl-1,3,4-oxadiazolin-2-yl) phosphonic acid or preferably a salt or ester thereof, the pyrolysis is generally carried out at preferred temperature ranges of 150° C. to 250° C. for the 3-oxo oxetan compounds and 80° C. to 200° C. for the 1,3,4-oxadiazoline compounds, respectively.

In conducting the pyrolysis reaction, the starting materials of Formula I can be heated directly or they can be suspended in a suspending agent or dissolved in an inert solvent and then the suspension or solution heated to the desired temperature. The suspending agent can be a high boiling oil such as mineral oil, for example, white oil or Nujol. Typical examples of the inert solvents are high boiling inert solvents such as dichlorobenzene, diphenyl ether, dodecyl benzene, chlorobenzene, cumene or xylene. The type of suspending agent or inert solvent used is not critical as long as said suspending agent or solvent does not react with any of the reactants and can withstand the particular temperature requirements of the pyrolysis reaction without decomposing or breaking down.

The pyrolysis of the starting material of Formula I is carried out for a time sufficient to complete the extrusion of sulfur dioxide, sulfur trioxide, carbon monoxide or nitrogen. The extrusion is generally complete when no more sulfur dioxide, sulfur trioxide, carbon monoxide or nitrogen is evolved from the reaction mixture.

The pyrolysis is usually carried out at atmospheric pressure although it can be carried out under reduced pressure, thus lowering the preferred reaction temperature a few degrees and facilitating the removal of sulfur dioxide, sulfur trioxide, carbon monoxide or nitrogen.

The desired end products of Formula II above, namely the salts or esters of ($\pm$) (cis-1,2-epoxypropyl) phosphonic acids or the acid itself can be isolated from the reaction by known methods, one such method being filtering off any insolubles, extracting the desired material into a low boiling solvent such as diethyl ether and distilling off the solvent until a residue or oil containing the desired product is left. The crude desired product can then be recrystallized from ethanol to improve its purity.

In another aspect of this invention, the elimination or extrusion of sulfur dioxide, sulfur trioxide, carbon monoxide or nitrogen from the corresponding starting compounds of Formula I can be effected by subjecting a solution or suspension of the respective starting material of Formula I to a source of short wave ultra violet light such as that produced by a mercury vapor lamp for a time sufficient to complete the reaction; the latter being when no more sulfur dioxide, sulfur trioxide, carbon monoxide or nitrogen is evolved.

Alternatively, the elimination or extrusion of sulfur dioxide, sulfur trioxide, carbon monoxide or nitrogen from the appropriate starting material of Formula I can be effected by subjecting to ultra violet light, a solution or suspension of the starting material of Formula I which has been sensitized to ultra violet light by the addition of about 10% (based on the weight of the starting material of Formula I) of a suitable sensitizing agent such as benzophenone or acetophenone.

In irradiating the reaction mixture, the solution or suspension of the appropriate starting material of Formula I should be contained in a vessel which preferably transmits ultra violet light such as a quartz vessel. The solvent employed should not react with the starting material of Formula I and should transmit rather than absorb ultra violet light. Suitable solvents include water, hydrocarbons such as hexane or cyclohexane, lower alkanols such as ethyl, methyl or butyl alcohol, carbon tetrachloride, dioxane, acetonitrile, tetramethylurea, 3,4-dichloro - 1,2,5 - thiadiazole or tributylamine or aqueous mixtures of all the foregoing solvents. Also mixtures of alkanols and benzene such as a 1:3 ethanol:benzene mixture or a 1:3 acetonitrile:benzene mixture are suitable.

Similarly, the temperature range is variable usually the irradiation being conducted at a temperature of about −10° C. to 50° C.

The above described pyrolysis and irradiation reactions are stereo specific and any particular stereo configuration of the starting material of Formula I will be carried through to the desired end product of Formula II. Thus, if the cis configuration of the compounds of Formula I are used as starting materials, (cis-1,2-epoxypropyl) phosphonic acid, or an ester or salt thereof would result.

Generally, the processes by which the starting materials of Formula I are prepared (described blow) will yield predominantly the ($\pm$) cis-isomer of the compound of Formula I. However, sometimes a cis/trans mixture of the starting material of Formula I will be formed and if this material is then pyrolyzed or irradiated, the desired cis-epoxypropyl phosphonic acid, ester or salt thereof will also be in the mixture of the cis/trans-isomers. The mixture of cis and trans-isomers of either the starting materials of Formula I or of the desired 1,2-epoxypropyl phosphonic acid compounds of Formula II are readily separated by techniques conventional in the art, including for example column chromatography, vapor phase chromatography or fractional distillation.

Furthermore, any ($\pm$) (trans-1,2-epoxypropyl) phosphonic acid, ester or salt thereof can be converted to the ($\pm$) cis-isomer by irradiation of a solution of the trans-isomer with ultra violet light or by subjecting a solution of the trans-isomer which has been sensitized to ultra violet light by the addition of about 10% of a suitable photo sensitizing agent such as benzophenone or acetophenone to ultra violet light. The conditions and solvents of the above reaction are similar to those already described for the elimination reaction performed on the starting materials of Formula I with ultra violet light.

The starting materials of Formula I which can be utilized are the salts and esters and the acids. It is preferable, however, to use the salt of the free acid. If the free acid is used, it is generally preferred to isolate the (cis-1,2-epoxypropyl) phosphonic acid produced as a salt, such as by the formation of a sodium or benzyl ammonium salt thereof. If an ester starting material of Formula I is used, the resulting ester of (cis-1,2-epoxypropyl) phosphonic acid can be converted to the acid or to a mono- or di-salt of the acid by hydrolysis or reductive removal of the ester group. The hydrolysis may be with base or acid, be enzymatic or light catalyzed or via a trimethyl silyl derivative. The reductive removal of the ester group may be by hydrogenolysis or chemical or with sodium tertiary amine.

Since the end products of Formula I are racemic mixtures, they can be resolved into their optically active forms. The (−) (cis-1,2-epoxypropyl) phosphonic acid referred to herein rotates plane-polarized light in a counterclockwise direction (to the left as viewed by the observer) when the rotation of its disodium salt is measured in water (5% concentration) at 405 m$\mu$.

The starting materials shown in Formula I can be prepared as described below.

The 1,3-oxathietane S,S-dioxide compounds of Formula I, called Formula V below, can be prepared according to the following reaction scheme:

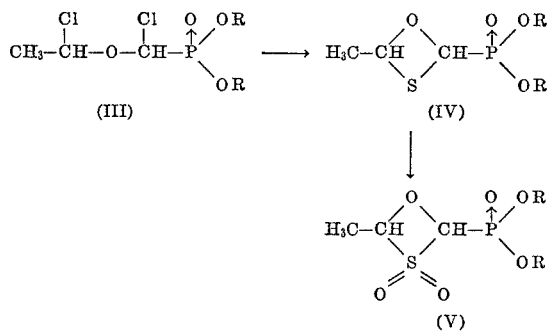

wherein R is as previously described.

Thus, the 3-oxathietane S,S-dioxide compounds of Formula V are prepared from a chloro-α-chloro ethoxy methyl phosphonic acid or an ester of salt thereof by reacting said chloro-α-chloro ethoxy methyl phosphonic acid compound with a sulfide, preferably sodium sulfide, to form the 1,3-oxathietane compound of Formula IV. This latter compound is then oxidized with oxidizing agents such as potassium permanganate or hydrogen peroxide to form the desired 1,3-oxathietane S,S-dioxide starting material of Formula V. The compound of Formula V can be isolated by known procedures or it can be immediately subject to a pyrolysis reaction to extrude sulfur dioxide thus forming the desired product of Formula II.

The 1,3,4-dioxathiol S,S-dioxide compounds of Formula I wherein Z is sulfur trioxide, called Formula VIII below, can be prepared according to the following equation scheme:

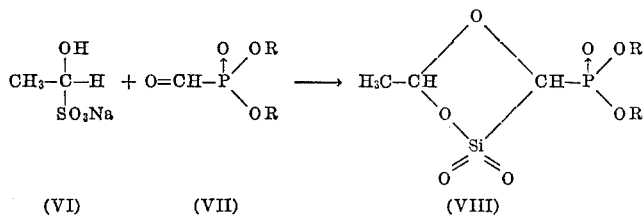

wherein R is as previously described.

In the above reaction, the bisulfite addition product of acetaldehyde (Formula VI) is reacted with the formyl phosphonate compound (Formula VII) in the presence of acetic anhydride followed by addition of a base to produce the desired 1,3,4-dioxathiol S,S-dioxide starting material. The formyl phosphonate compound (Formula VII) can itself be prepared by ozonizing vinyl phosphonic acid or an ester or salt thereof. The ozonization is generally carried out at temperatures of −70° C. to +5° C. with the vinyl phosphonic acid, ester or salt thereof (preferably the ester) generally dissolved in an inert solvent such as saturated hydrocarbons, for example, pentane, hexane, cyclohexane or other solvents such as tetrahydrofuran or halogenated hydrocarbons such as chloroform, iodoform and the like. Ozone is passed into the reaction mixture generally in combination with nitrogen and oxygen; ozone being about 4% of the volume.

The reaction between the bisulfite addition product (Formula VI) and the formyl phosphonate compound (Formula VII) are then reacted together in the presence of acetic anhydride generally at the reflux temperature of the reaction mixture to form the desired starting material (Formula VIII). If phosphonic acid or a salt thereof is used above, an intermediate product is formed. The intermediate is then converted by the addition of a strong base, such as for example, sodium hydroxide, to the desired starting material (Formula VIII).

In order to prepare the starting materials of Formula I wherein Z is

one can follow the following reaction scheme:

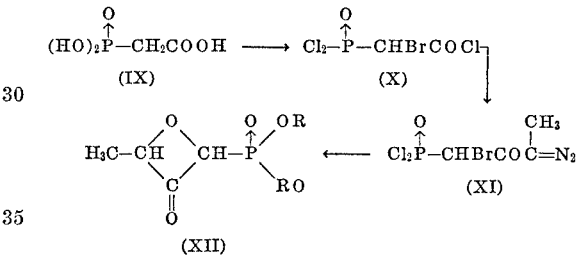

In the above reaction scheme, phosphonoacetic acid is halogenated and converted to the halogenated phosphonic dichloride compound (Formula X) which latter compound is diazotized to form the 3-diazo compound (Formula XI). The latter compound is then cyclized to form the desired 3-oxo oxetan starting material (Formula XII). In forming the compound of Formula XII, the phosphonoacetic acid is generally reacted with thionyl chloride followed by the addition of a halogen, preferably bromine to form the halogenated phosphonic dichloride compound (Formula X). The thionyl chloride generally acts as its own solvent although other inert solvents such as benzene, ether, or hexane can be used.

The halogenated phosphonic dichloride (Formula X) is then diazotized to form a 1-halo-3-diazo-2-oxobutyl phosphonic dichloride compound of Formula XI. Treatment of the 3-diazo compound of Formula XI with an aqueous solution of a carbonate, preferably potassium carbonate and an acid such as acetic acid at room temperatures, preferably from 10° C. to 50° C. results in the insertion of a carbon monoxide group in the molecule to form the desired (4-methyl-3-oxo oxetan-2-yl) phosphonic acid. The starting acid (Formula XII) can be isolated by known methods such as by filtering off an insoluble and concentrating the reaction mixture to yield a solid material. The acid can then be converted to an ester or a salt thereof, by conventional ester and salt formation techniques.

In order to prepare the starting materials of Formula I wherein Z is

namely the appropriately substituted (5-methyl-1,3,4-oxidiazolin-2-yl) phosphonic acid, ester or salt of Formula I, the following reaction scheme can be utilized:

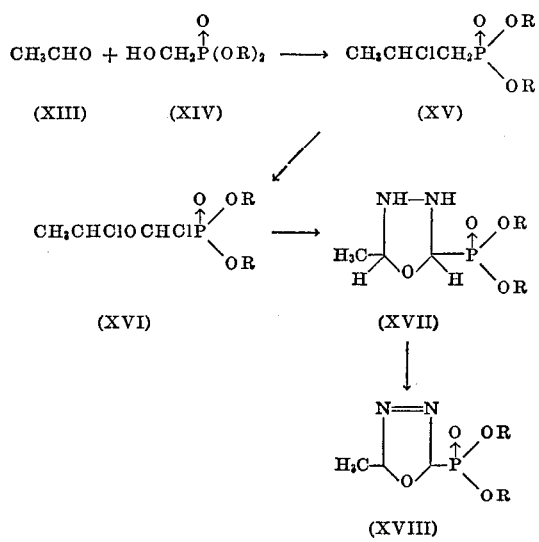

wherein R is as previously described.

In the above reaction, acetaldehyde (Formula XIII) is reacted with a hydroxy methyl phosphonic acid, ester or salt (Formula XIV) to form an (α-chloroethoxy) methyl phosphonic acid, ester or salt thereof (Formula XV). This reaction is generally carried out at a temperature of from about −5° C. to 25° C. in the presence of an inert solvent such as chloroform, carbon tetrachloride, an aromatic hydrocarbon, such as benzene or a halogenated aromatic hydrocarbon such as chlorobenzene, or an ether such as tetrahydrofuran, diethyl ether or dioxane. The reaction is also carried out under acid conditions with acids such as HCl being preferred. The chlorinating agent in the above reaction is generally hydrogen chloride gas.

In order to prepare the chloro-α-chloroethoxy methyl phosphonic acid, ester or salt thereof (Formula XVI), the α-chloroethoxy methyl phosphonic acid compound of Formula XV is reacted with a free radical halogenating agent such as t-butyl hypochlorite. This reaction is generally carried out at a temperature of approximately 40° C. This temperature is critical to initiate the free radical halogenation, which halogenation in this case is initated by the addition of a free radical halogenation initiator such as azobisisobutyronitrile. The free radical halogenation can also be initiated photo chemically.

The free radical halogenation is generally carried out in an inert solvent. The solvent is one which must not be attacked in the free radical reaction. Typical solvents are aromatic or cyclic aliphatic hydrocarbons such as benzene, cyclohexyl, n-aliphatics, for example, n-hexane and halogenated hydroarbons such as carbon tetrachloride.

In order to convert the chloro-α-chloroethoxy methyl phosphonic acid, ester or salt thereof (Formula XVI) to the cyclic diazo (Formula XVII), the compound of Formula XVI is reacted with hydrazine at a temperature of about 15° C. to 80° C. This latter reaction will yield (5-methyl-1,3,4-oxadiazolidin-2-yl) phosphonic acid or an ester or salt thereof of Formula XVII. The formation of the 1,3,4-oxadiazolidin compound can be accomplished in an inert solvent, such as a tertiary amine or in a mixed solvent such as a tertiary amine in alcohol or a tertiary amine in ether, benzene or toluene.

The compound of Formula XVII is then oxidized to form the described salt or ester of (5-methyl-1,3,4-oxadiazolin-2-yl) phosphonic acid or the acid itself of Formula XVIII. The formation of this latter compound is generally carried out by treating the 1,3,4-ozadiazolidin (Formula XVII) with mercuric oxide or cupric chloride at a temperature of about 15° C. to the reflux temperature of the particular solvent used. The solvents for the oxidation reaction can be any inert solvent such as an ether, for example diethyl ether or a hydrocarbon such as benzene or cyclohexane. The desired (5-methyl-1,3,4-oxadiazolin-2-yl) phosphonic acid, ester or salt thereof can then be isolated by methods known in the art such as for example by filtering off insolubles and then evaporating the solvent under reduced pressure.

The following are detailed examples which show the preparation of the starting materials and the desired salts or esters of (±) (cis-1,2-epoxypropyl) phosphonic acid and the acid itself. They should be considered as illustrations of the invention and not limitations thereof.

EXAMPLE 1

Preparation of sodium (±) (cis-4-methyl-1,3-oxathietan-2-yl) phosphonate S,S-dioxide 0.21 g. (0.12 mole) of chloro-α-chloroethoxy methyl phosphonic acid in 120 ml. of 4:5 water:ethyl alcohol mixture is added slowly to 50 g. of sodium sulfide hydrate in 60 ml. of 4:5 water:ethyl alcohol mixture at reflux. After all the chloro-α-chloroethoxy methyl phosphonic acid is added, the reaction mixture is heated and refluxed for an additional one-half hour. Ethyl alcohol is then removed under vacuum and mercuric acetate is added portionwise to precipitate any excess sulfide in the solution. The reaction mixture is then filtered and the filtrate is freed of water by lyophilization, leaving sodium (±) (cis-4-methyl-1,3-oxathietan-2-yl) phosphonate S,S-dioxide, as an amorphous residue.

The sodium (±) (cis-4-methyl-1,3-oxathietan-2-yl) phosphonate S,S-dioxide is then stirred for approximately 12 hours with 100 ml. of glacial acetic acid and 100 ml. of 30% hydrogen peroxide. Excess peroxide is then decomposed by stirring the reaction mixture with manganese dioxide and the solution then filtered. Acetic acid is removed from the reaction mixture under reduced pressure to yield sodium (±) (cis-4-methyl-1,3-oxathietan-2-yl) phosphonate S,S-dioxide as a residue.

Following the procedure above, but using an equivalent amount of methyl, diethyl or dibenzyl or sodium chloro-α-chloroethoxy methyl phosphonate in place of chloro-α-chloroethoxy methyl phosphonic acid used above, there is obtained methyl, diethyl or dibenzyl (±) (cis-4-methyl-1,3-oxathietan-2-yl) phosphonate S,S-dioxide, respectively.

EXAMPLE 2

Preparation of (±) (cis-1,3-epoxypropyl) phosphonic acid

The residue obtained in Example 1, namely (±) (cis-methyl-1,3-oxathietan-2-yl) phosphonic acid S,S-dioxide is refluxed in 100 ml. of pyridine for two hours. The pyridine is then removed under reduced pressure and the residue treated with 50 ml. of water. The aqueous solution is then clarified by charcoal treatment and the suspension filtered. The filtrate contains (±) (cis-1,2-epoxypropyl) phosphonic acid.

Following the procedure above, but using an equivalent amount of calcium, disodium, benzyl ammonium, methyl, diethyl, dibenzyl or sodium (±) (cis-4-methyl-1,3-oxathietan-2-yl) phosphonate S,S-dioxide in place of (±) (cis-4-methyl-1,3-oxathietan-2-yl) phosphonic acid S,S-dioxide used above, there is obtained calcium, disodium, benzyl ammonium, methyl, diethyl, dibenzyl or sodium (±) (cis-1,3-epoxypropyl) phosphonate, respectively.

EXAMPLE 3

Preparation of sodium (±) (cis-2-methyl-1,3,4,dioxathiol-5-yl) phosphonate S,S-dioxide An oxygen stream containing 4–5% of ozone is passed through a solution of 0.1 mole of diethyl vinyl phosphonate in 500 ml. of chloroform at −10° C. until analysis of the effluent gas stream indicates that absorption of ozone has ceased. To the stirred chloroform solution which contains diethyl formyl phosphonate is added at room temperature 8 g. of the bisulfite addition product of acetaldehyde and 100 ml. of acetic anhydride. Chloroform is then distilled off at atmosphric pressure and the stirred reaction mixture is brought to reflux temperature of acetic anhydride and held at this temperature for an additional one hour. Excess acetic anhydride is then removed under reduced pressure and the residue is dissolved in 50 ml. of methanol and heated on a steam bath with 200 ml. of 1 N sodium hydroxide for two hours. The pH of the reaction mixture is then brought to pH 6–7 by the addition of acetic acid. The solution is then extracted with ether and the ether removed under reduced pressure to yield sodium (±) (cis-2-methyl-1,3,4-dioxathiol-5-yl) phosphonate S,S-dioxide.

Following the procedure above but eliminating the treatment with sodium hydroxide and the further adjustment of the pH and using an equivalent amount of calcium, disodium, benzyl ammonium, methyl, dibenzyl formyl phosphonate or formyl phosphonic acid in place of diethyl formyl phosphonate used above, there is produced calcium, disodium, benzyl ammonium, methyl, dibenzyl (±) (cis-2-methyl-1,3,4-dioxathiol-5-yl) phosphonate S,S-dioxide or (±) (cis-2-methyl-1,3,4-dioxathiol-5-yl) phosphonic acid, respectively.

EXAMPLE 4

Preparation of sodium (±) (cis-1,2-epoxypropyl) phosphonate

The sodium (±) (cis-2-methyl-1,3,4-dioxathiol-5-yl) phosphonate S,S-dioxide obtained from Example 3 is suspended in 100 ml. of white oil and passed through a tube filled with glass beads, which tube is maintained at a temperature of approximately 200° C. The effluent from the tube is cooled and diluted with 2 volumes of hexane. The hexane mixture is then extracted with 2 × 50 ml. of water. The aqueous extract is lyophilized to give sodium (±) (cis-1,2-epoxypropyl) phosphonate.

Following the procedure above but using an equivalent amount of calcium, disodium, benzyl ammonium, methyl, dibenzyl (±) (cis-2-methyl-1,3,4-dioxathiol-5-yl) phosphonate S,S-dioxide or (±) cis-2-methyl-1,2,4-dioxathiol-5-yl) phosphonic acid in place of sodium (±) (cis-2-methyl - 1,3,4-dioxathiol-5-yl) phosphonate S,S-dioxide used above, there is obtained calcium, disodium, benzyl ammonium methyl or dibenzyl (±) (cis-1,2-epoxypropyl) phosphonate or (±) (cis-1,2-epoxypropyl) phosphonic acid, respectively.

EXAMPLE 5

Preparation of (±) (cis-4-methyl-3-oxo oxetan-2-yl) phosphonic acid 14.0 g. (0.1 mole) of phosphonoacetic acid is warmed at 60° C. in 100 ml. of thionyl chloride until all the phosphonoacetic acid dissolves. The solution is then heated to reflux and 17.6 (0.11 mole) of bromine is added over a one hour period to the refluxing solution. After the addition of bromine is complete, refluxing is continued for an additional one hour after which time the excess thionyl chloride is removed under vacuum. The resulting viscous oily residue which is [bromo(chloro formyl)methyl] phosphonic dichloride is then dissolved in 150 ml. of dry ethyl ether and the ether solution added slowly to 11.2 g. (0.2 mole) of diazo ethane dissolved in 200 ml. of dry ethyl ether. The reaction mixture is maintained for 12 hours at room temperature and is then concentrated under reduced pressure to yield (1-bromo-3-diazo-2-oxobutyl) phosphonic dichloride as a residue. To the resulting residue of (1-bromo-3-diazo-2-oxobutyl) phosphonic dichloride is added at 0° C. to 5° C. 100 ml. of methanol, 30 g. of potassium carbonate and 40 ml. of water.

The mixture is then stirred for 5 hours and the water and methanol removed from the reaction solution under reduced pressure. The residue is taken up in 250 ml. of acetic acid and the mixture refluxed for an additional two hours. The acetic acid is then removed under reduced pressure to yield (±) (cis-4-methyl-3-oxo oxetan-2-yl) phosphonic acid as a residue.

The (±) (cis-4-methyl-3-oxo oxetan-2-yl) phosphonic acid prepared above can be converted to the calcium, disodium, benzyl ammonium, methyl, diethyl, dibenzyl or mono sodium (±) (cis-4-methyl-3-oxo oxetan-2-yl) phosphonate, respectively.

EXAMPLE 6

Preparation of (±) (cis-1,2-epoxypropyl) phosphonic acid

The (±) (cis-4-methyl-3-oxo oxetan-2-yl) phosphonic acid obtained from Example 5 is added to a flask and the material is then heated under reduced pressure at 150° C. to 200° C. The heat is supplied by means of an oil bath. The reaction mixture is maintained at 150° C. to 200° C. until no more carbon monoxide is evolved. To the resulting dark residue is added 150 ml. of water and the aqueous solution then treated with charcoal and filtered to yield a solution containing (±) (cis-1,2-epoxypropyl) phosphonic acid.

Following the procedure above but using an equivalent amount of calcium, disodium, benzylammonium, methyl, diethyl, dibenzyl or sodium (±) (cis-4-methyl-3-oxo oxetan-2-yl) phosphonate in place of (±) (cis-4-methyl-3-oxo oxetan-2-yl) phosphonic acid used above, there is obtained calcium, disodium, benzylammonium, methyl, diethyl, dibenzyl or sodium (±) (cis-1,2-epoxypropyl) phosphonate, respectively.

EXAMPLE 7

Preparation of sodium (±) (cis-5-methyl-1,3,4-oxadiazolin-2-yl) phosphonate

A solution of 48 g. (0.1 mole) of acetaldehyde and 112 g. (1 mole) of hydroxy methyl phosphonic acid in 500 ml. of benzene is saturated at 10° C. to 15° C. with hydrogen chloride gas and the resulting mixture is then stored for 24 hours at room temperature. Benzene and excess hydrogen chloride are removed under reduced pressure and the resulting residue is flushed several times with benzene to remove any trace of acid. The (α-chloroethoxy) methyl phosphonic acid formed is re-dissolved in benzene and heated at 40° C. with 87.2 g. (0.8 mole) of t-butyl hypochlorite and 0.1 mole percent of azobisisobutyronitrile under a nitrogen atmosphere. Heating is continued until titration of an aliquot of the reaction mixture indicates that all the hypochlorite is consumed. The reaction mixture is then washed with water and concentrated under reduced pressure to yield chloro-α-chloroethoxy methyl phosphonic acid as an oily residue. The oily residue is then dissolved in 500 ml. of pyridine and 48 g. (1.5 mole) of anhydrous hydrazine is added. The reaction mixture is then stirred for six hours at room temperature after which it is diluted with one-third volume of water and concentrated to an approximate volume of 100 ml. 300 ml. of diethyl ether and 500 ml. of water are added and the diethyl ether layer separated from the aqueous layer. The ether layer is washed several times with water to remove pyridine and unreacted hydrazine and then dried over molecular sieves to yield a solution containing (±) (cis-5-methyl-1,3,4-oxadiazolidin - 2 - yl) phosphonic acid. The dry ether solution containing (±) (cis-5-methyl-1,3,4-oxadiazolidin-2-yl) phosphonic acid is then shaken for 12 hours with 237 g. of yellow mercuric oxide; insolubles are then filtered off and the diethyl ether evaporated under reduced pressure. The residue is then suspended in 300 ml. of water and 0.1 N sodium hydroxide is added. The aqueous slurry is evaporated to yield sodium (±) (cis-5-methyl-1,3,4-oxadiazolin-2-yl) phosphonate.

The (±) (cis - 5 - methyl-1,3,4-oxadiazolin-2-yl) phosphonic acid obtained after oxidation with mercuric oxide can be converted to calcium, disodium or benzyl ammonium (±) (cis - 5 - methyl-1,3,4-oxadiazolin-2-yl) phosphonate respectively by using in calcium hydroxide, two equivalents of sodium hydroxide or benzylamine in place of sodium hydroxide.

The methyl or diethyl (±) (cis-5-methyl-1,3,4-oxadiazolin-2-yl) phosphonate can be prepared by following the above procedure and adding diazo methane or diazo ethane to the dry ether solution of (±) (cis-5-methyl-1,3,4-oxadiazolidin-2-yl) phosphonic acid.

Dibenzyl (±) (cis - 5 - methyl-1,3,4-oxadiazolin-2-yl) phosphonate can be prepared by following the procedure of Example 7, but starting with an equivalent amount of dibenzyl hydroxy methyl phosphonate in place of hydroxy methyl phosphonic acid used above.

EXAMPLE 8

Preparation of sodium (±) (cis-1,2-epoxypropyl) phosphonate

The sodium (±) (cis-5-methyl-1,3,4-oxadiazolin-2-yl) phosphonate obtained in Example 7 is heated at 100° C. to 110° C. under reduced pressure until the evolution of nitrogen ceases. The resulting residue is extracted with water, filtered free of insolubles then lyophilized. The resulting amorphous residue containing sodium (±) (cis-1,2-epoxypropyl) phosphonate is analyzed by converting a portion of the product to the free acid and esterifying with diazo methane to yield the methyl ester.

Following the procedure above but using an equivalent amount of calcium, disodium, benzyl ammonium, methyl, diethyl or dibenzyl (±) (cis-5-methyl-1,3,4-oxadiazolin-2-yl) phosphonate or (±) (cis-5-methyl-1,3,4-oxadiazolin-2-yl) phosphonic acid in place of sodium (±) (cis-5-methyl-1,3,4-oxadiazolin-2-yl) phosphonate used above, there is obtained calcium, disodium, benzyl ammonium, methyl, diethyl or dibenzyl (±) (cis-1,2-epoxypropyl) phosphonate or (±) (cis-1,2-epoxypropyl) phosphonic acid, respectively.

EXAMPLE 9

Preparation of (±) (cis-1,2-epoxypropyl) phosphonic acid

To a stirred solution containing 5 g. of (±) (cis-4-methyl-1,3-oxathietan-2-yl) phosphonic acid S,S-dioxide in 50 ml. of water in a 100 ml. quartz flask is irradiated with a 200 watt mercury vapor lamp while maintaining the temperature at 0° C. to 5° C. by means of an ice bath. The reaction mixture is irradiated until no more sulfur dioxide was evolved. The reaction mixture is then freeze dried to yield (±) (cis-1,2-epoxypropyl) phosphonic acid.

Following the procedure above but using sodium (±) (cis-2-methyl-1,3,4-dioxathiol-5-yl) phosphonate S,S-dioxide; (±) (cis-4-methyl-3-oxo oxetan-2-yl) phosphonic acid or sodium (±) (cis-5-methyl-1,3,4-oxadiazolin-2-yl) phosphonate in place of (±) (cis-4-methyl-1,3-oxathietan-2-yl) phosphonic acid S,S-dioxide and using 500 ml. of a 1:3 ethanol:benzene mixture in place of water, there is obtained sodium (±) (cis-1,2-epoxypropyl) phosphonate; (±) (cis-1,2-epoxypropyl) phosphonic acid; and sodium (±) (cis-1,2-epoxypropyl) phosphonate, respectively.

Similarly, by following the above procedure but irradiating calcium, disodium, benzyl ammonium, methyl, diethyl or dibenzyl, salts or esters of the above starting materials, there are obtained the corresponding calcium, disodium, benzyl ammonium, methyl, diethyl or dibenzyl salts or esters of (±) (cis-1,2-epoxypropyl) phosphonic acid.

EXAMPLE 10

Preparation of (±) (cis-1,2-epoxypropyl) phosphonic acid

To a 250 ml. round bottom Pyrex flask equipped with a magnetic stirrer and thermometer is added 3.0 g. of (±) (cis-4-methyl-1,3-oxathietan-2-yl) phosphonic acid S,S-dioxide, 100 ml. of aqueous dioxane and 0.25 g. of benzophenone. The reaction mixture is then irradiated with a 200 watt mercury lamp while maintaining the temperature at about 10° C. to 20° C. by means of an ice bath. Upon cessation of the evolution of carbon dioxide, (±) (cis-1,2-epoxypropyl) phosphonic acid is formed.

Following the above procedure, but using sodium (±) (cis-2-methyl-1,3,4-dioxathiol-5-yl) phosphonate S,S-dioxide; (±) (cis-4-methyl-3-oxo oxetan-2-yl) phosphonic acid; or sodium (±) (cis-5-methyl-1,3,4-oxadiazolin-2-yl) phosphonate in place of (±) (cis-4-methyl-1,3-oxathietan-2-yl) phosphonic acid S,S-dioxide used above, there is obtained sodium (±) (cis-1,2-epoxypropyl) phosphonate; (±) (cis-1,2-epoxypropyl) phosphonic acid or sodium (±) (cis-1,2-epoxypropyl) phosphonate, respectively.

Similarly, by following the above procedure but irradiating calcium, disodium, benzyl ammonium, methyl, diethyl or dibenzyl, salts or esters of the above starting materials, there are obtained the corresponding calcium, disodium, benzyl ammonium, methyl, diethyl or dibenzyl salts or esters of (±) (cis-1,2-epoxypropyl) phosphonic acid.

What is claimed is:

1. A process for the preparation of (cis-1,2-epoxypropyl) phosphonic acid, esters or salts thereof which comprises extruding or eliminating carbon monoxide from [(4-methyl-1,3-oxathietan-2-yl) phosphonic acid S,S-dioxide; (2-methyl-1,3,4-dioxathiol-5-yl) phosphonic acid S,S-dioxide]; (4-methyl-3-oxo oxetan-2-yl) phosphonic acid or esters or salts of the acids by heating at a temperature of from 150–250° C.

2. A process for the preparation of cis-compounds of the formula:

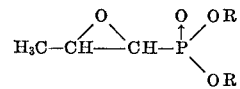

wherein R is the same or different and is hydrogen, or a hydrocarbyl radical and the organic or inorganic salts thereof when at least one of R is hydrogen; which comprises extruding or eliminating carbon monoxide from a cis-compound of the formula

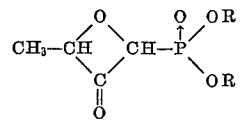

wherein R is as above

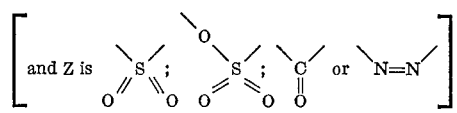

by heating at a temperature of from 150–250° C.

3. A process of claim 2 wherein the cis-compound formed is a racemic mixture.

4. A process of claim 2 wherein the compound formed is an organic or inorganic salt when at least one of R is hydrogen.

5. A process of claim 2 wherein the compound of the formula

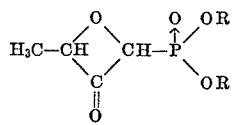

is suspended in a suspending agent or dissolved in an inert solvent.

6. The process of claim 5 wherein the suspending agent or inert solvent is selected from the group consisting of mineral oil, dichlorobenzene, diphenylether, dodecylbenzene, chlorobenzene, cumene, and xylene.

References Cited

Thielheimer, W., Synthetic Methods of Organic Chemistry, vol. 13 (1959) p. 430; vol. 18 (1964), p. 413; and vol. 19 (1965) p. 405.

Zimakov, P. V., Okis' Etilena, (1946), p. 102.

NORMA S. MILESTONE, Primary Examiner

U.S. Cl. X.R.

260—999, 333, 327, 307; 204—158

UNITED STATES PATENT OFFICE
CERTIFICATE OF CORRECTION

Patent No. 3,595,880          Dated July 27, 1971

Inventor(s) Raymond A. Firestone

It is certified that error appears in the above-identified patent and that said Letters Patent are hereby corrected as shown below:

Column 12, line 65, cancel

" [ and Z is $\underset{O}{\overset{\diagdown}{\underset{\diagup}{S}}}\overset{\diagup}{\underset{\diagdown}{O}}$ ; $\underset{O}{\overset{\diagdown}{\underset{\diagup}{S}}}\overset{O}{\underset{\diagdown}{\diagup}}\overset{\diagup}{\underset{\diagdown}{O}}$ ; $\underset{O}{\overset{\diagdown}{\underset{\diagup}{C}}}\overset{\diagup}{}$ or $\overset{\diagdown}{N}{=}\overset{\diagup}{N}$ ] ".

Signed and sealed this 30th day of May 1972.

(SEAL)
Attest:

EDWARD M. FLETCHER, JR.          ROBERT GOTTSCHALK
Attesting Officer          Commissioner of Patents